United States Patent
Kono et al.

(10) Patent No.: US 8,546,290 B2
(45) Date of Patent: Oct. 1, 2013

(54) SOLID CATALYST COMPONENT FOR OLEFIN POLYMERIZATION, MANUFACTURING METHOD, AND CATALYST AND OLEFIN POLYMER MANUFACTURING METHOD

(75) Inventors: Hiroyuki Kono, Chigasaki (JP); Takashi Fujita, Chigasaki (JP)

(73) Assignee: Toho Titanium Co., Ltd., Chigasaki-shi (JP)

( * ) Notice: Subject to any disclaimer, the term of this patent is extended or adjusted under 35 U.S.C. 154(b) by 17 days.

(21) Appl. No.: 13/143,217

(22) PCT Filed: Dec. 17, 2009

(86) PCT No.: PCT/JP2009/071515
§ 371 (c)(1),
(2), (4) Date: Jul. 5, 2011

(87) PCT Pub. No.: WO2010/079701
PCT Pub. Date: Jul. 15, 2010

(65) Prior Publication Data
US 2011/0269926 A1 Nov. 3, 2011

(30) Foreign Application Priority Data
Jan. 7, 2009 (JP) .................. 2009-001383

(51) Int. Cl.
B01J 31/00 (2006.01)
B01J 37/00 (2006.01)
C08F 4/02 (2006.01)
C08F 4/60 (2006.01)

(52) U.S. Cl.
USPC .................. 502/118; 502/226; 502/227

(58) Field of Classification Search
None
See application file for complete search history.

(56) References Cited

U.S. PATENT DOCUMENTS

| | | | |
|---|---|---|---|
| 5,945,366 | A | 8/1999 | Kataoka et al. |
| 7,141,634 | B2 | 11/2006 | Hosaka et al. |
| 7,704,910 | B2 | 4/2010 | Hosaka et al. |
| 2009/0253874 | A1 | 10/2009 | Hosaka et al. |

FOREIGN PATENT DOCUMENTS

| | | |
|---|---|---|
| EP | 1790667 A1 * | 5/2007 |
| JP | 6 157659 | 6/1994 |
| JP | 6 287225 | 10/1994 |

(Continued)

OTHER PUBLICATIONS

Office Action issued Sep. 3, 2012 in Chinese Patent Application No. 200980154048.5 (with English translation).
Extended European Search Report issued Apr. 4, 2012, in Patent Application No. 09837586.8.

(Continued)

*Primary Examiner* — Ling Choi
*Assistant Examiner* — Catherine S Branch
(74) *Attorney, Agent, or Firm* — Oblon, Spivak, McClelland, Maier & Neustadt, L.L.P.

(57) ABSTRACT

A solid catalyst component for olefin polymerization includes a solid component obtained by causing a magnesium compound (a), a titanium halide compound (b), and an electron donor compound (c) to come in contact with each other, the titanium compound in an amount equivalent to a titanium content of 0.2 to 2.5 wt % in the solid catalyst component being washed away from the solid catalyst component by washing with heptane. A granular or spherical polymer that has high stereoregularity and a narrow particle size distribution can be obtained in high yield while suppressing production of a fine powder by polymerizing an olefin using a catalyst that includes the solid catalyst component.

6 Claims, 1 Drawing Sheet

(56) References Cited

FOREIGN PATENT DOCUMENTS

| JP | 2003 201310 | 7/2003 |
| JP | 2004 269809 | 9/2004 |
| JP | 2006 63282 | 3/2006 |
| JP | 2006 199739 | 8/2006 |
| JP | 2006 274105 | 10/2006 |

OTHER PUBLICATIONS

International Search Report Issued Apr. 6, 2010 in PCT/JP09/071515 filed Dec. 17, 2009.

Office Action issued Mar. 28, 2013 in Chinese Application No. 200980154048.5 (With English Translation).

* cited by examiner

US 8,546,290 B2

SOLID CATALYST COMPONENT FOR OLEFIN POLYMERIZATION, MANUFACTURING METHOD, AND CATALYST AND OLEFIN POLYMER MANUFACTURING METHOD

TECHNICAL FIELD

The invention relates to a solid catalyst component for olefin polymerization that can produce a polymer having high stereoregularity in high yield while suppressing production of a fine powder, a method of producing the same, a catalyst, and a method of producing an olefin polymer.

BACKGROUND ART

A solid catalyst that includes a transition metal catalyst component (e.g., titanium) and a main group metal catalyst component (e.g., aluminum) has been widely used when polymerizing an olefin.

A supported olefin polymerization catalyst using a magnesium compound as a support exhibits remarkably improved polymerization activity. A polymer that exhibits high stereoregularity can also be produced using an α-olefin having 3 or more carbon atoms by adding an electron donor such as an ester compound to the catalyst.

Such a supported catalyst ensures an improvement in activity that makes it unnecessary to remove a catalyst residue (e.g., chlorine and titanium) from the polymer (deashing), an improvement in yield of a stereoregular polymer, and an improvement in durability of the catalyst activity during polymerization. However, when polymerizing an olefin using a polymerization catalyst that includes such a highly active catalyst component and organoaluminum compound and an electron donor compound (e.g., silicon compound), a large amount of fine powder may be produced, and the particle size distribution may become broad due to a fine powder of the solid catalyst component and particulate fracture due to heat of reaction during polymerization. If the amount of fine powder increases, the production process may be hindered (e.g., a uniform reaction may not occur, or a pipe may be clogged when transferring the polymer). If the particle size distribution becomes broad, the polymer molding process may be adversely affected. Therefore, development of a catalyst that can produce a polymer having a uniform particle size and a narrow particle size distribution while suppressing production of a fine powder has been desired.

As a means for solving the problems relating to the fluidity and the particle size distribution of the polymer, and simplifying the production process, Patent Document 1 (JP-A-6-157659) discloses an olefin polymerization catalyst that includes a solid catalyst component obtained by adding a suspension of spherical dialkoxymagnesium, an aromatic hydrocarbon, and a phthalic diester to a mixed solution of an aromatic hydrocarbon and titanium tetrachloride, reacting the mixture, reacting the resulting product with titanium tetrachloride, and washing the resulting product.

Patent Document 2 (JP-A-6-287225) discloses a solid catalyst component for olefin polymerization obtained by adding a suspension of spherical dialkoxymagnesium, an aromatic hydrocarbon, and a phthalic diester to a mixed solution of an aromatic hydrocarbon and titanium tetrachloride, reacting the mixture, washing the reaction product with an aromatic hydrocarbon, reacting the product with titanium tetrachloride, washing the resulting product to obtain a solid component, drying the solid component, and removing a fine powder.

The above technology reduces the amount of fine powder by removing a fine powder of the solid catalyst component. However, the above technology cannot control production of a fine powder caused by particulate fracture due to heat of reaction during polymerization.

(Patent Document 1) JP-A-6-157659
(Patent Document 2) JP-A-6-287225

Accordingly, an object of the invention is to provide a solid catalyst component for olefin polymerization that can produce a polymer having high stereoregularity and a narrow particle size distribution in high yield while suppressing production of a fine powder, a method of producing the same, a catalyst, and a method of producing an olefin polymer.

SUMMARY OF THE INVENTION

In view of the above situation, the inventors of the invention conducted extensive studies. As a result, the inventors found that a component (d) remains on the surface and the inside of a solid catalyst component when causing the solid component to come in contact with a solution including the component (d) under specific conditions, and a polymer having high stereoregularity and a narrow particle size distribution can be produced in high yield while suppressing production of a fine powder by polymerizing an olefin in the presence of a catalyst produced in a state in which the component (d) remains. This finding has led to the completion of the invention.

Specifically, the invention provides a solid catalyst component for olefin polymerization including a solid component obtained by causing a magnesium compound (a), a titanium halide compound (b), and an electron donor compound (c) to come in contact with each other, the titanium compound in an amount equivalent to a titanium content of 0.2 to 2.5 wt % in the solid catalyst component being washed away from the solid catalyst component by repeating a washing operation eight times, the washing operation including washing the solid catalyst component with 10 ml/g of heptane at 40° C. for 5 minutes.

The invention also provides a method of producing a solid catalyst component for olefin polymerization, the method including causing a solid component (A1) obtained by causing a magnesium compound (a), a titanium halide compound (b), and an electron donor compound (c) to come in contact with each other, to come in contact with an inert organic solvent that includes a titanium compound (d) in an amount 0.1 to 15 times (molar ratio of titanium atoms) the amount of the titanium compound included in the solid component (A1) so that the titanium compound (d) remains on the surface or the inside of the solid component (A1), and drying the mixture to obtain a powder.

The invention also provides an olefin polymerization catalyst (A) including the above solid catalyst component for olefin polymerization, an organoaluminum compound (B) shown by the following general formula (I), and an external electron donor compound (C), $$R^1_p AlQ_{3-p} \qquad (1)$$

wherein $R^1$ represents an alkyl group having 1 to 4 carbon atoms, Q represents a hydrogen atom or a halogen atom, and p is an integer that is larger than 0 and 3 or less.

The invention further provides a method of producing an olefin polymer including polymerizing an olefin in the presence of the above olefin polymerization catalyst.

A polymer having high stereoregularity and a narrow particle size distribution can be produced in high yield while suppressing production of a fine powder by utilizing a catalyst produced using the above solid catalyst component for olefin polymerization. Therefore, a general-purpose polyolefin can be provided at low cost.

DESCRIPTION OF EXEMPLARY EMBODIMENTS

Figure 1:
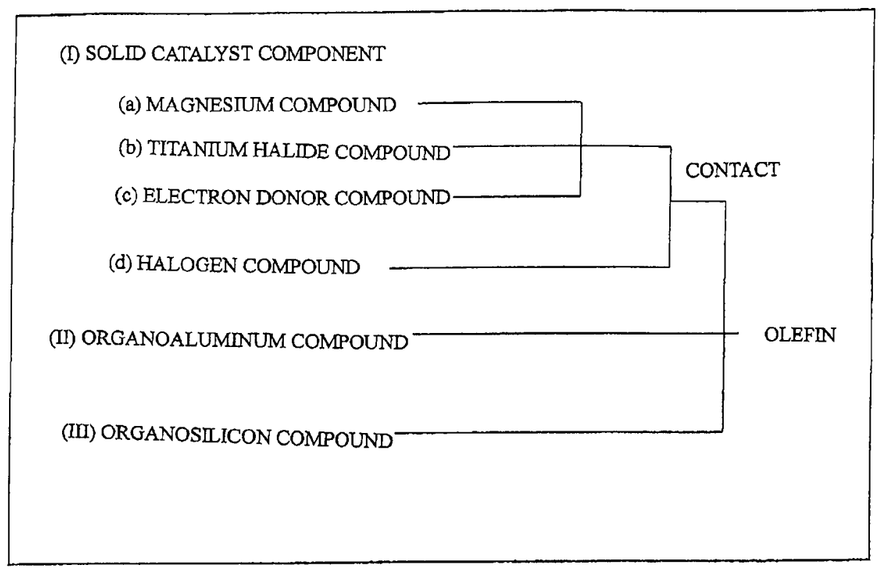
FIG. 1 is a flowchart showing a production process of a catalyst component and a polymerization catalyst according to the invention.

Examples of the magnesium compound (a) (hereinafter may be referred to as "component (a)") used to produce the solid catalyst component (A) (hereinafter may be referred to as "component (A)") included in an olefin polymerization catalyst according to one embodiment of the invention include a magnesium dihalide, a dialkylmagnesium, an alkylmagnesium halide, a dialkoxymagnesium, a diaryloxymagnesium, an alkoxymagnesium halide, a fatty acid magnesium, and the like. Among these, a magnesium dihalide, a mixture of a magnesium dihalide and a dialkoxymagnesium, and a dialkoxymagnesium (particularly a dialkoxymagnesium) are preferable. Specific examples of the dialkoxymagnesium include dimethoxymagnesium, diethoxymagnesium, dipropoxymagnesium, dibutoxymagnesium, ethoxymethoxymagnesium, ethoxypropoxymagnesium, butoxyethoxymagnesium, and the like. It is particularly preferable to use diethoxymagnesium.

The dialkoxymagnesium may be produced by reacting magnesium metal with an alcohol in the presence of a halogen-containing organic metal compound or the like. The above dialkoxymagnesiums may be used either individually or in combination. It is preferable to use a dialkoxymagnesium in the form of granules or a powder. The dialkoxymagnesium in the form of granules or a powder may be amorphous or spherical. When using a spherical dialkoxymagnesium, for example, a polymer powder having an excellent particle shape and a narrow particle size distribution is obtained. This improves the handling capability of the polymer powder during polymerization, and prevents a situation in which a filter of a polymer separation apparatus is clogged by a fine powder, for example.

The spherical dialkoxymagnesium need not necessarily be completely spherical, but may be oval or potato-shaped. Specifically, the spherical dialkoxymagnesium may have a ratio (L/W) of the major axis diameter (L) to the minor axis diameter (W) of 3 or less, preferably 1 to 2, and more preferably 1 to 1.5.

The dialkoxymagnesium may have an average particle size of 1 to 200 μm. The average particle size of the dialkoxymagnesium is preferably 5 to 150 μm. The spherical dialkoxymagnesium normally has an average particle size of 1 to 100 μm, preferably 5 to 80 μm, and more preferably from 10 to 60 μm. It is preferable to use a dialkoxymagnesium that has a low fine powder content and a low coarse powder content, and has a narrow particle size distribution. Specifically, it is preferable to use a dialkoxymagnesium having a content of particles having a particle size of 5 μm or less of 20% or less, and preferably 10% or less. It is preferable to use a dialkoxymagnesium having a content of particles having a particle size of 100 μm or more of 10% or less, and preferably 5% or less. The particle size distribution "D90/D10" (where, D90 is a particle size corresponding to 90% in the cumulative particle size distribution curve, and D10 is a particle size corresponding to 10% in the cumulative particle size distribution curve) of the dialkoxymagnesium is 3 or less, and preferably 2 or less.

A spherical dialkoxymagnesium may be produced by the method disclosed in JP-A-58-4132, JP-A-62-51633, JP-A-3-74341, JP-A-4-368391, or JP-A-8-73388, for example.

The titanium halide compound (b) (hereinafter may be referred to as "component (b)") used to produce the solid catalyst component (A) is at least one compound selected from tetravalent titanium halides and alkoxytitanium halides shown by the following general formula $Ti(OR^2)_nX_{4-n}$ (wherein $R^2$ represents an alkyl group having 1 to 4 carbon atoms, X represents a halogen atom, and n is an integer from 0 to 4).

Specific examples of the titanium halides include titanium tetrahalides such as titanium tetrachloride, titanium tetrabromide, and titanium tetraiodide. Specific examples of the alkoxytitanium halides include methoxytitanium trichloride, ethoxytitanium trichloride, propoxytitanium trichloride, n-butoxytitanium trichloride, dimethoxytitanium dichloride, diethoxytitanium dichloride, dipropoxytitanium dichloride, di-n-butoxytitanium dichloride, trimethoxytitanium chloride, triethoxytitanium chloride, tripropoxytitanium chloride, tri-n-butoxytitanium chloride, and the like. Among these, titanium tetrahalides (particularly titanium tetrachloride) are preferable. These titanium compounds may be used either individually or in combination.

The electron donor compound (c) (hereinafter may be referred to as "component (c)") used to produce the solid catalyst component (A) is an organic compound that includes an oxygen atom or a nitrogen atom. Examples of the electron donor compound (c) include alcohols, phenols, ethers, esters, ketones, acid halides, aldehydes, amines, amides, nitriles, isocyanates, organosilicon compounds including an Si—O—C bond or an Si—N—C bond, and the like.

Specific examples of the electron donor compound (c) include alcohols such as methanol, ethanol, n-propanol, and 2-ethylhexanol, phenols such as phenol and cresol, ethers such as methyl ether, ethyl ether, propyl ether, butyl ether, amyl ether, diphenyl ether, 9,9-bis(methoxymethyl)fluorene, and 2-isopropyl-2-isopentyl-1,3-dimethoxypropane, monocarboxylic esters such as 4-ethylheptane-3,5-diol dibenzoate, methyl formate, ethyl acetate, vinyl acetate, propyl acetate, octyl acetate, cyclohexyl acetate, ethyl propionate, ethyl butyrate, ethyl 3-benzoyloxybutyrate, isobutyl 3-benzoyloxybutyrate, ethyl 3-benzoyloxy-4,4-dimethylvalerate, ethyl 2-methyl-3-benzoyloxyvalerate, isobutyl 4-methyl-3-benzoyloxyvalerate, ethyl 5-isobutyl-4-benzoyloxycaprate, ethyl benzoate, propyl benzoate, butyl benzoate, octyl benzoate, cyclohexyl benzoate, phenyl benzoate, methyl 4-methylbenzoate, ethyl 4-methylbenzoate, methyl p-methoxybenzoate, and ethyl p-methoxybenzoate, malonic diesters such as diethyl malonate, dipropyl malonate, dibutyl malonate, di-isobutyl malonate, dipentyl malonate, dineopentyl malonate, diethyl isopropylbromomalonate, diethyl butylbromomalonate, diethyl isobutylbromomalonate, diethyl diisopropylmalonate, diethyl dibutylmalonate, diethyl diisobutylmalonate, diethyl diisopentylmalonate, diethyl isopropylbutylmalonate, dimethyl isopropylisopentylmalonate, diethyl bis(3-chloro-n-propyl)malonate, and diethyl bis(3-bromo-n-propyl)malonate, succinic diesters such as diethyl 2,3-diethylsuccinate, diethyl 2,3-dipropylsuccinate, diethyl 2,3-diisopropylsuccinate, diethyl 2,3-dibutylsuccinate, diethyl 2,3-diisobutylsuccinate, diethyl 2,3-di-t-butylsuccinate, dibutyl 2,3-diethylsuccinate, dibutyl 2,3-dipropylsuccinate, dibutyl 2,3-diisopropylsuccinate, dibutyl 2,3-dibutylsuccinate, dibutyl 2,3-diisobutylsuccinate, and dibutyl 2,3-di-t-butylsuccinate, dicarboxylic diesters such as diethyl maleate, dibutyl maleate, dimethyl adipate, diethyl adipate, dipropyl adipate, dipropyl adipate, dibutyl adipate, diisodecyl adipate, dioctyl adipate, phthalic diesters, and phthalic diester derivatives, ketones such as acetone, methyl ethyl ketone, methyl butyl ketone, acetophenone, and benzophenone, acid chlorides such as phthalic dichloride and terephthalic dichloride, aldehydes such as acetaldehyde, propionaldehyde, octyl aldehyde, and benzaldehyde, amines such as methylamine, ethylamine, tributylamine, piperidine, aniline, and pyridine, amides such as olefin acid amide and stearic acid amide, nitriles such as acetonitrile, benzonitrile, and tolunitrile, isocyanates such as methyl isocyanate and ethyl isocyanate, organosilicon compounds including an Si—O—C bond, such as phenylalkoxysilanes, alkylalkoxysilanes, phenylalkylalkoxysilanes, cycloalkylalkoxysilanes, and cycloalkylalkylalkoxysilanes, and organosilicon compounds including an Si—N—C bond, such as bis(alkylamino)dialkoxysilanes, bis(cycloalkylamino)dialkoxysilanes, alkyl(alkylamino)dialkoxysilanes, dialkylaminotrialkoxysilanes, and cycloalkylaminotrialkoxysilanes.

Among these electron donor compounds, esters (particularly aromatic dicarboxylic diesters) are preferable. Phthalic diesters and phthalic diester derivatives are particularly preferable. Specific examples of the phthalic diesters include dimethyl phthalate, diethyl phthalate, di-n-propyl phthalate, di-isopropyl phthalate, di-n-butyl phthalate, di-isobutyl phthalate, ethylmethyl phthalate, methylisopropyl phthalate, ethyl(n-propyl) phthalate, ethyl(n-butyl) phthalate, ethylisobutyl phthalate, di-n-pentyl phthalate, diisopentyl phthalate, dineopentyl phthalate, dihexyl phthalate, di-n-heptyl phthalate, di-n-octyl phthalate, bis(2-ethylhexyl) phthalate, diisodecyl phthalate, and the like. These phthalic diesters may be used either individually or in combination.

Examples of the phthalic diester derivatives include compounds obtained by substituting one or two hydrogen atoms in the benzene ring of the above phthalic diester that is bonded to the two ester groups with an alkyl group having 1 to 5 carbon atoms or a halogen atom (e.g., chlorine atom, bromine atom, or fluorine atom). A solid catalyst component produced using the phthalic diester derivative as the electron donor compound can improve the hydrogen response, so that the melt flow rate of the resulting polymer can be improved even if the amount of hydrogen added during polymerization is identical or smaller.

The above esters may preferably be used in combination. In this case, it is preferable to use esters that differ in the total number of carbon atoms of the alkyl group by four or more.

The solid component is preferably produced by causing the components (a), (b), and (c) to come in contact with each other in the presence of an inert organic solvent. The inert organic solvent dissolves the titanium halide compound, but does not dissolve the dialkoxymagnesium. Specific examples of the inert organic solvent include saturated hydrocarbon compounds such as pentane, hexane, heptane, octane, nonane, decane, and cyclohexane, aromatic hydrocarbon compounds such as benzene, toluene, xylene, and ethylbenzene, halogenated hydrocarbon compounds such as methylene chloride and 1,2-dichlorobenzene, ethers such as diethyl ether, and the like. Among these, aromatic hydrocarbon compounds that are liquid at room temperature and have a boiling point of 50 to 150° C. (e.g., toluene and xylene), and saturated hydrocarbon compounds that are liquid at room temperature and have a boiling point of 50 to 150° C. (e.g., hexane, heptane, and cyclohexane) are preferably used.

These solvents may be used either individually or in combination.

The solid component used to produce the component (A) is preferably produced by preparing a suspension using the component (a), the component (c), and the aromatic hydrocarbon compound having a boiling point of 50 to 150° C., causing the suspension to come in contact with a mixed solution obtained using the component (b) and the aromatic hydrocarbon compound, and reacting the mixture.

The solid component is preferably produced using a polysiloxane in addition to the above components. The stereoregularity or the crystallinity of the resulting polymer can be improved using the polysiloxane. Moreover, production of a fine powder can be reduced. The term "polysiloxane" refers to a polymer that includes a siloxane bond (—Si—O bond) in the main chain, and is also referred to as "silicone oil". The polysiloxane used in the invention is a chain-like, partially hydrogenated, cyclic, or modified polysiloxane that is liquid or viscous at room temperature, and has a viscosity (25° C.) of 0.02 to 100 $cm^2/s$ (2 to 1000 cSt).

Examples of the chain-like polysiloxane include dimethylpolysiloxane and methylphenylpolysiloxane. Examples of the partially hydrogenated polysiloxane include methyl hydrogen polysiloxane having a hydrogenation rate of 10 to 80%. Examples of the cyclic polysiloxanes include hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. Examples of the modified polysiloxane include higher fatty acid group-substituted dimethylsiloxane, epoxy group-substituted dimethylsiloxane, and polyoxyalkylene group-substituted dimethylsiloxane. Among these, decamethylcyclopentasiloxane and dimethylpolysiloxane are preferable, and decamethylcyclopentasiloxane is particularly preferable.

The solid component is produced by causing the components (a), (b), and (c) to come in contact with each other optionally together with the aromatic hydrocarbon compound or the polysiloxane. The solid component is produced as described below. Specifically, the solid component is produced by suspending the magnesium compound (a) in the titanium halide compound (b) or the aromatic hydrocarbon compound, and causing the electron donor compound (c) (e.g., phthalic diester) and the optional tetravalent titanium halide compound (b) to come in contact with the suspension. In this case, a solid component (component (A)) having a spherical shape and a narrow particle size distribution can be obtained when using a spherical magnesium compound. A solid component having a spherical shape and a narrow particle size distribution can also be obtained without using a spherical magnesium compound, by forming particles using a spray dry method that sprays and dries a solution or a suspension using a sprayer, for example.

The components are caused to come in contact with each other in an inert gas atmosphere with stirring in a vessel equipped with a stirrer from which water and the like have been removed. The contact temperature employed when causing the components to come in contact with each other may be either the same as or different from the reaction temperature. When merely causing the components to come into contact with each other, and stirring (mixing) the components, or dispersing or suspending the components to effect modification, the components may be caused to come in contact with each other at a relatively low temperature around room temperature. When reacting the components that have been caused to come in contact with each other, it is preferable to employ a temperature in the range from 40 to 130° C. If the reaction temperature is less than 40° C., the reaction may not proceed sufficiently, so that the resulting solid catalyst component may exhibit insufficient performance. If the reaction temperature exceeds 130° C., it may be difficult to control the reaction due to significant vaporization of the solvent, for example. The reaction time is 1 minute or more, preferably 10 minutes or more, and still more preferably 30 minutes or more.

The solid catalyst component (A) is obtained by causing the solid component to come in contact with an inert organic solvent that includes a titanium compound (d) (hereinafter may be referred to as "component (d)") in an amount 0.1 to 15 times (preferably 0.3 to 5 times, and particularly preferably 0.5 to 1.5 times) (molar ratio of titanium atoms) the amount of the titanium compound included in the solid component so that the titanium compound (d) remains on the surface of the solid component or inside of the solid component, and drying the mixture. The step of causing the solid component to come in contact with the component (d) may be referred to as "component (d) post-contact step". The titanium compound (d) may be at least one compound selected from the titanium halide compounds and the alkoxytitanium halides mentioned above in connection with the component (b). It is preferable to use the tetravalent titanium halide compound (particularly preferably titanium tetrachloride) from the viewpoint of improving the polymerization activity of the resulting solid catalyst component (A).

Examples of the inert organic solvent include saturated hydrocarbon compounds such as hexane, heptane, octane, cyclohexane, methylcyclohexane, ethylcyclohexane, 1,2-diethylcyclohexane, methylcyclohexene, and decalin, aromatic hydrocarbons such as benzene, toluene, xylene, and ethylbenzene, halogenated hydrocarbon compounds such as orthodichlorobenzene, methylene chloride, carbon tetrachloride, and dichloroethane, and the like. Among these, it is preferable to use a saturated or aromatic hydrocarbon compound that is liquid at room temperature and has a boiling point of about 50 to about 150° C. (e.g., heptane, ethylcyclohexane, toluene, xylene, or ethylbenzene). These solvents may be used either individually or in combination.

The solid component is preferably caused to come in contact with the inert organic solvent that includes the component (d) by stirring a mixture of a suspension (X) of the solid component (A1) in the inert organic solvent, and the inert organic solvent (Y) that includes the titanium compound (d) in an amount 0.1 to 15 times (molar ratio of titanium atoms) the amount of the titanium compound included in the solid component (A1) at 40 to 110° C. (preferably 85 to 105° C., and particularly preferably 85 to 100° C.) for 2 to 10 minutes, allowing the mixture to stand, and removing the supernatant liquid to obtain a solid component (A2) (first step (hereinafter may be referred to as "component (d) post-contact step")).

It is preferable to stir a mixture of the solid component (A2) and the inert organic solvent (Y) that includes the titanium compound (d) in an amount 0.1 to 15 times (molar ratio of titanium atoms) the amount of the titanium compound included in the solid component (A1) at 40 to 110° C. for 2 to 10 minutes, allowing the mixture to stand, and removing the supernatant liquid to obtain a solid component (A3) (second step). The solid component and the inert organic solvent (Y) that includes the component (d) may be caused to come in contact with each other 2 to 8 times (preferably 3 to 6 times). In this case, a specific amount of the component (d) can be allowed to remain on the surface of the solid component or inside of the solid component.

In the first step or the second step, the solid component obtained by removing the supernatant liquid is dried to obtain a powder. The solid catalyst component (A) is thus obtained. After causing the solid component to come in contact with the inert organic solvent (Y) that includes the component (d), the component (d) is present in the solvent, and is also present on the surface of the solid component or inside of the solid component. The solid component is dried in a state in which the component (d) is present on the surface of the solid component or inside of the solid component. Specifically, the solid component obtained by removing the inert organic solvent is dried by vacuum drying, heating, heating under vacuum, or the like to obtain a powder.

As a result, a specific amount of the component (d) that is similar to a free component and differs from the catalytically active component is incorporated in the resulting solid catalyst component. Production of a fine powder can be reduced by polymerizing an olefin using the resulting solid catalyst component.

The solid catalyst component (A) is characterized in that a titanium compound in an amount equivalent to a titanium content of 0.2 to 2.5 wt % in the solid catalyst component is washed away from the solid catalyst component by repeating a washing operation eight times, the washing operation including washing the solid catalyst component with 10 ml/g of heptane at 40° C. for 5 minutes. Specifically, the titanium compound that is washed away from the solid catalyst component is the component (d). The amount of titanium compound that is washed away by the washing operation refers to a value obtained by subtracting the titanium content in the solid catalyst component (A) after washing from the titanium content in the solid catalyst component (A) before washing. The component (d) can be almost completely washed away by repeating the washing operation eight times.

When performing the washing operation for measuring the amount of the component (d) that remains in the solid catalyst component (A), a 500 ml round bottom flask equipped with a stirrer, of which the internal atmosphere has been sufficiently replaced with nitrogen gas, is charged with 10 g of the solid catalyst component (A). After the addition of 100 ml of heptane (40° C.), the mixture is stirred at 40° C. for 5 minutes. The stirrer includes a stirring shaft provided at the center of the round bottom flask, and a stirring blade attached to the stirring shaft. The stirring blade has a semicircular shape, and has a width of 60 mm, a height of 19 mm, and a thickness of 4 mm. The stirring speed is 200 rpm. Specifically, the stirring blade has a semicircular shape that protrudes downward. The end of the stirring shaft is secured at the center of the semicircular shape. The stirring blade is symmetrical with respect to the stirring shaft.

It is particularly preferable to produce the component (A) by suspending the magnesium compound (a) in the aromatic hydrocarbon compound having a boiling point of 50 to 150° C., causing the titanium halide compound (b) to come in contact with the suspension, and reacting the mixture. In this case, at least one electron donor compound (c) (e.g., phthalic diester) is caused to come in contact with the suspension at −20 to 130° C. before or after causing the titanium halide compound (b) to come in contact with the suspension, optionally causing the polysiloxane to come in contact with the mixture, and reacting the mixture to obtain a solid component. It is preferable to perform an aging treatment (reaction) at a low temperature before or after causing at least one electron donor compound to come in contact with the suspension. The resulting solid component is washed with a hydrocarbon compound (intermediate washing) to obtain a solid component. The component (d) post-contact step is then performed to obtain the component (A).

The ratio of the components used when producing the solid component differs depending on the production method. For example, the tetravalent titanium halide compound (b) is used in an amount of 0.5 to 100 mol, preferably 0.5 to 10 mol, and still more preferably 1 to 5 mol, per mol of the magnesium compound (a). The electron donor compound (c) is used in an amount of 0.01 to 10 mol, preferably 0.01 to 1 mol, and still more preferably 0.02 to 0.6 mol, per mol of the magnesium compound (a). The aromatic hydrocarbon compound is used in an amount of 0.001 to 500 mol, preferably 0.001 to 70 mol, and still more preferably 0.005 to 50 mol, per mol of the magnesium compound (a). The polysiloxane is used in an amount of 0.01 to 100 g, preferably 0.05 to 80 g, and still more preferably 1 to 50 g, per mol of the magnesium compound (a).

The titanium content, the magnesium content, the halogen atom content, and the electron donor compound content in the component (A) is not particularly limited. The titanium content is normally 1.0 to 10 wt %, preferably 2.0 to 10 wt %, and more preferably 3.0 to 10 wt %; The magnesium content is normally 10 to 70 wt %, preferably 10 to 50 wt %, more preferably 15 to 40 wt %, and particularly preferably 15 to 25 wt %. The halogen atom content is normally 20 to 90 wt %, preferably 30 to 85 wt %, more preferably 40 to 80 wt %, and particularly preferably 45 to 80 wt %. The electron donor compound content is normally 0.5 to 30 wt %, preferably 1 to 25 wt %, and particularly preferably 2 to 20 wt %.

The organoaluminum compound (B) (hereinafter may be referred to as "component (B)") that is used when producing the olefin polymerization catalyst is not particularly limited insofar as the organoaluminum compound (B) is a compound shown by the general formula (1). In the general formula (1), $R^1$ preferably represents an ethyl group or an isobutyl group, Y preferably represents a hydrogen atom, a chlorine atom, or a bromine atom, and n is preferably 2 or 3 (particularly preferably 3). Specific examples of the organoaluminum compound include triethylaluminum, diethylaluminum chloride, triisobutylaluminum, diethylaluminum bromide, and diethylaluminum hydride. These compounds may be used either individually or in combination. Among these, triethylaluminum and triisobutylaluminum are preferable.

An external electron donor compound (C) (hereinafter may be referred to as "component (C)") is also used in addition to the components (A) and (B) when producing the olefin polymerization catalyst according to one embodiment of the invention.

The same compound as the electron donor compound (c) used when producing the solid catalyst component may be used as the external electron donor compound (C). It is preferable to use an ether, an ester, or an organosilicon compound as the external electron donor compound (C). The ether is preferably 1,3-diether (particularly preferably 9,9-bis(methoxymethyl)fluorene or 2-isopropyl-2-isopentyl-1,3-dimethoxypropane). The ester is preferably methyl benzoate or ethyl benzoate.

Examples of the organosilicon compound include a compound shown by the following general formula (3).

$$R^3{}_q Si(NR^4R^5)_r(OR^6)_{4-(q+r)} \quad (3)$$

wherein q is 0 or an integer from 1 to 4, r is 0 or an integer from 1 to 4, provided that q+r is an integer from 0 to 4, $R^3$, $R^4$, and $R^5$ individually represent a hydrogen atom, a linear or branched alkyl group having 1 to 12 carbon atoms, a substituted or unsubstituted cycloalkyl group, a phenyl group, a vinyl group, an allyl group, or an aralkyl group, and may include a hetero atom, and $R^6$ individually represent an alkyl group having 1 to 4 carbon atoms, a cycloalkyl group, a phenyl group, a vinyl group, an allyl group, or an aralkyl group, provided that $R^4$ and $R^5$ may bond to each other to form a ring.

$R^3$ in the general formula (3) preferably represents a linear or branched alkyl group having 1 to 10 carbon atoms or a cycloalkyl group having 5 to 8 carbon atoms, and particularly preferably represents a linear or branched alkyl groups having 1 to 8 carbon atoms or a cycloalkyl group having 5 to 8 carbon atoms. $R^4$ and $R^5$ preferably represent a linear or branched alkyl group having 1 to 10 carbon atoms or a cycloalkyl group having 5 to 8 carbon atoms, and particularly preferably represent a linear or branched alkyl groups having 1 to 8 carbon atoms or a cycloalkyl group having 5 to 8 carbon atoms. $NR^4R^5$ formed when $R^4$ and $R^5$ bond to each other is preferably a perhydroquinolino group or a perhydroisoquinolino group. $R^6$ preferably represents a linear or branched alkyl group having 1 to 6 carbon atoms, and particularly preferably represents a linear or branched alkyl group having 1 to 4 carbon atoms.

Examples of the organosilicon compound shown by the general formula (3) in which r is 0 include phenylalkoxysilanes such as phenyltrimethoxysilane, alkylalkoxysilanes such as t-butylmethyldimethoxysilane and t-butylethyldimethoxysilane, phenylalkylalkoxysilanes such as phenylmethyldimethoxysilane, cycloalkylalkoxysilanes such as dicyclohexyldimetoxysilane, dicyclopenthyldimetoxysilane, dicyclopenthyl diethoxysilane, and cyclohexylcyclopentyldimethoxysilane, and cycloalkylalkylalkoxysilanes such as cyclohexyl methyldimetoxysilane. Examples of the organosilicon compound shown by the general formula (3) in which r is an integer from 1 to 4 include (alkylamino)alkoxysilanes such as isopropylaminotrimethoxysilane, t-butylaminotrimethoxysilane, cyclopentylaminotrimethoxysilane, cyclohexylaminotrimethoxysilane, diisopropylaminodimethoxysilane, di-t-butylaminodimethoxysilane, dicyclopentylaminodimethoxysilane, dicyclohexylaminodimethoxysilane, di-t-butylaminoethylaminomethoxysilane, and dicyclopentylaminoethylaminomethoxysilane, alkyl(alkylamino)alkoxysilanes such as isopropylisopropylaminodimethoxysilane, t-butyl-t-butylaminodimethoxysilane, cyclopentylcyclopentylaminodimethoxysilane, cyclohexylcyclohexylaminodimethoxysilane, isopropylisopropylaminoethylaminomethoxysilane, t-butyl-t-butylaminoethylaminomethoxysilane, cyclopentylcyclopentylaminoethylaminomethoxysilane, cyclohexylcyclohexylaminoethylaminomethoxysilane, diisopropylaminoethylaminomethoxysilane, di-t-butylethylaminomethoxysilane, dicyclopentylethylaminomethoxysilane, and cyclohexylmethylethylaminomethoxysilane, alkyl(alkylamino)silanes such as triethylethylaminosilane, triisopropylethylaminosilane, diisopropyldiethylaminosilane, di-t-butyldiethylaminosilane, t-butylmethyldiethylaminosilane, t-butylethyldiethylaminosilane, dicyclopentyldiethylaminosilane, cyclohexylmethyldiethylaminosilane, t-butylethylaminodiethylaminosilane, cyclopentylethylaminodiethylaminosilane, and cyclohexylethylaminodiethylaminosilane, alkylaminosilanes such as tetrakis(isopropylamino)silane, tetrakis(t-butylamino)silane, tetrakis(cyclopentylamino)silane, and tetrakis(cyclohexylamino)silane, and the like.

These organosilicon compounds (C) may be used either individually or in combination. These external electron donor compounds may be used either individually or in combination.

A method of producing an olefin polymer according to one embodiment of the invention includes subjecting an olefin to homopolymerization, random copolymerization, or block copolymerization in the presence of the olefin polymerization catalyst according to one embodiment of the invention. Examples of the olefin include ethylene, propylene, 1-butene, 1-pentene, 4-methyl-1-pentene, vinylcyclohexane, and the like. These olefins may be used either individually or in combination. Among these, ethylene, propylene, and 1-butene are preferable, and propylene is particularly preferable. Propylene may be copolymerized with another olefin. For example, propylene may be copolymerized with ethylene, propylene, 1-butene, 1-pentene, 4-methyl-1-pentene, vinylcyclohexane, or the like. These olefins may be used either individually or in combination. Among these, ethylene and 1-butene are preferable. Propylene may typically be copolymerized with another olefin by random copolymerization that polymerizes propylene and a small amount of ethylene, or propylene-ethylene block copolymerization that polymerizes propylene in a first stage (first polymerization tank), and copolymerizes propylene and ethylene in a second stage (second polymerization tank) or a multi-stage (multi-stage polymerization tank). The catalyst according to one embodiment of the invention that includes the components (A), (B), and (C) is also effective for random copolymerization and block copolymerization in order to improve the catalytic activity, the stereoregularity, and/or the hydrogen response. It is also possible to achieve excellent copolymerization performance, and improve the properties of the resulting copolymer. An alcohol may be added to the polymerization system in order to prevent formation of gel in the final product when shifting from homopolymerization of propylene to block copolymerization. Specific examples of the alcohol include ethyl alcohol, isopropyl alcohol, and the like. The alcohol is used in an amount of 0.01 to 10 mol, and preferably 0.1 to 2 mol, based on 1 mol of the component (B).

The components may be used in an arbitrary ratio insofar as the effects of the invention are not adversely affected. The component (B) is normally used in an amount of 1 to 2000 mol, and preferably 50 to 1000 mol, based on 1 mol of a titanium atom in the component (A). The component (C) is used in an amount of 0.002 to 10 mol, preferably 0.01 to 2 mol, and particularly preferably 0.1 to 0.5 mol, based on 1 mol of the component (B).

The components may be caused to come in contact with each other in an arbitrary order. It is preferable to add the organoaluminum compound (B) to the polymerization system, then cause the component (C) to come in contact with the organoaluminum compound (B), and then cause the solid catalyst component (A) to come in contact with the mixture.

The polymerization method according to one embodiment of the invention may be carried out in the presence or absence of an organic solvent. The olefin monomer such as propylene may be used in a gaseous state or a liquid state. The polymerization temperature is normally 200° C. or less, and preferably 100° C. or less, and the polymerization pressure is normally 10 MPa or less, and preferably 6 MPa or less. A continuous polymerization method or a batch polymerization method may be used. The polymerization reaction may be performed in one stage or a multi-stage.

When polymerizing the olefin using a catalyst that includes the component (A) and the component (B) or the component (C) (hereinafter may be referred to as "main polymerization"), it is preferable to perform preliminary polymerization before the main polymerization in order to further improve the catalytic activity, the stereoregularity, the properties of the resulting particles, and the like. The olefin subjected to the main polymerization or a monomer such as styrene may be used for preliminary polymerization. Specifically, the component (A) is caused to come in contact with the component (B) or the component (C) in the presence of the olefin to preliminarily polymerize 0.1 to 100 g of a polyolefin per g of the component (A), caused to come in contact with the component (B) and/or the component (C) to form a catalyst.

Each component and the monomer may be caused to come in contact with each other in an arbitrary order during preliminary polymerization. It is preferable to add the component (B) to the preliminary polymerization system in an inert gas atmosphere or a gas atmosphere (e.g., propylene), then cause the component (A) to come in contact with the component (B), and then cause the olefin (e.g., propylene) and/or one or more other olefins to come in contact with the mixture. The preliminary polymerization temperature is not particularly limited, but is preferably –10 to 70° C., and more preferably from 0 to 50° C.

EXAMPLES

The invention is further described below by way of examples. Note that the invention is not limited to the following examples.

Example 1

Production of Solid Component

A 500 ml round bottom flask equipped with a stirrer, of which the internal atmosphere had been sufficiently replaced with nitrogen gas, was charged with 20 g of diethoxymagnesium and 100 ml of toluene to prepare a suspension. The suspension was added to a 500 ml round bottom flask equipped with a stirrer, of which the internal atmosphere had been sufficiently replaced with nitrogen gas, that was charged with a solution of 40 ml of toluene and 60 ml of titanium tetrachloride to obtain a suspension. The suspension was reacted at 6° C. for 1 hour. After the addition of 6 ml of di-n-butyl phthalate, the mixture was heated to 105° C., and reacted for 2 hours with stirring. After completion of the reaction, the product was washed four times with 200 ml of toluene (100° C.) to obtain a solid component (A1). The titanium content in the solid component was 3.3 wt %. The titanium content in the solid component was measured by the following method.

Measurement of Titanium Content in Solid Component 3 g of the solid sample was put in a 100 ml recovery flask in a nitrogen atmosphere. The pressure was reduced to 0.02 torr or less at 60° C. for 3 hours. The organic solvent component was completely removed from the solid sample to obtain a measurement sample (Y). The titanium content (X) was measured in accordance with JIS M 8311-1997 (oxidation-reduction titration method), and the titanium content in the solid sample was calculated by the following expression.

$$\text{Titanium content(wt \%)in solid sample} = (X(g)/Y(g)) \times 100$$

Production of Solid Catalyst Component (A)

A 500 ml round bottom flask equipped with a stirrer, of which the internal atmosphere had been sufficiently replaced with nitrogen gas, was charged with 20 g of the solid component (A1) and 80 ml of heptane. The mixture was then stirred to prepare a suspension. After the addition of 120 ml of a heptane solution (room temperature) containing 2 ml of titanium tetrachloride, the mixture was heated to 100° C., stirred for 5 minutes, and allowed to stand. The supernatant liquid was then removed (first contact operation). After the addition of 120 ml of a heptane solution (room temperature) containing 2 ml of titanium tetrachloride, the mixture was stirred at 100° C. for 5 minutes, and allowed to stand. The supernatant liquid was then removed (second contact operation). The contact operation was then repeated three times. The product was then filtered, and dried to obtain a powdery solid catalyst component (A). The titanium content in the solid catalyst component (A) was 3.9 wt %. Specifically, the titanium content in the solid catalyst component (A) increased by 0.6 wt % (3.9-3.3 wt %) by performing the component (d) post-contact step. Whether or not the following washing method is appropriate for quantitative determination of the titanium compound (titanium tetrachloride) was determined as described below. The amount of titanium tetrachloride contained in the heptane solution was 1.3 times (molar ratio of titanium atoms) the amount of the titanium compound contained in the solid component.

Quantitative Determination of Titanium Compound Washed Away

A 500 ml round bottom flask equipped with a stirrer, of which the internal atmosphere had been sufficiently replaced with nitrogen gas, was charged with 10 g of the solid catalyst component (A). After the addition of 100 ml of heptane (40° C.), the mixture was stirred at 40° C. and 200 rpm for 5 minutes. The mixture was then filtered to obtain the washed solid catalyst component (A). The washing operation was repeated seven times (eight washing operations were performed in total). The stirrer included a stirring shaft provided at the center of the round bottom flask, and a stirring blade attached to the stirring shaft. The stirring blade had a semicircular shape, and had a width of 60 mm, a height of 19 mm, and a thickness of 4 mm. A fluororesin stirring blade "F-4022-3" (manufactured by Flon Industry Co., Ltd.) was used as the stirring blade. The titanium content in the solid catalyst component (A) after washing the solid catalyst component (A) eight times was 3.3% (i.e., the amount of titanium washed away was 0.6 wt %). It was thus confirmed that the above washing method is appropriate.

Production of Polymerization Catalyst and Polymerization

A 2.0 l autoclave equipped with a stirrer, of which the internal atmosphere had been entirely replaced with nitrogen gas, was charged with 1.32 mmol of triethylaluminum, 0.13 mmol of cyclohexylmethyldimethoxysilane, and the solid component in an amount equivalent to 0.0026 mmol of titanium atoms to obtain a polymerization catalyst. After the addition of 1.5 l of hydrogen gas and 1.4 l of liquified propylene, preliminary polymerization was carried out at 20° C. for 5 minutes. The mixture was then heated to 70° C., and polymerized for 1 hour. The polymerization activity per g of the solid catalyst component, the boiling n-heptane insoluble content (HI) in the polymer, the melt flow rate (MFR) of the polymer, the amount of fine powder (particle size: 44 or 75 μm or less), and the average particle size and the particle size distribution of the polymer are shown in Table 1.

The polymerization activity per g of the solid catalyst component was calculated by the following expression.

Polymerization activity=polymer produced(g)/solid catalyst component(g)

The boiling n-heptane insoluble content (HI) (wt %) in the polymer was determined by extracting the polymer with boiling n-heptane for 6 hours. The melt flow rate (MFR) of the polymer was determined in accordance with ASTM D1238. The amount of fine powder (particle size: 44 or 75 μm or less) was determined by placing the polymer on a 330 mesh or 200 mesh sieve, adding ethanol to the polymer, centrifuging the ethanol suspension that passed through the sieve and contained particles to collect the solid (particles), drying the solid under reduced pressure, and measuring the weight of the dried product. The amount of coarse powder (particle size: 1700 μm or more) was determined in the same manner as described above using a 10 mesh sieve. The average particle size and the particle size distribution of the polymer were determined by measuring the particle size distribution in accordance with JIS K 0069, and calculating the particle size corresponding to a cumulative weight of 10%, 50%, and 90%.

Example 2

A solid catalyst component (A) and a polymerization catalyst were produced, and polymerization was carried out in the same manner as in Example 1, except for using an equal amount of diisobutyl phthalate instead of di-n-butyl phthalate. The results are shown in Table 1. The titanium content in the solid component was 3.3 wt %, and the titanium content in the solid catalyst component (A) was 3.9 wt % (i.e., the titanium content increased by 0.6 wt %). The amount of titanium tetrachloride contained in the heptane solution was 1.3 times (molar ratio of titanium atoms) the amount of the titanium compound contained in the solid component.

Example 3

Production of Solid Component 20 g of anhydrous magnesium chloride, 100 ml of decane, and 80 g of 2-ethylhexyl alcohol were heated at 135° C. for 4 hours to obtain a homogeneous solution. After the addition of 4.5 g of phthalic anhydride, the mixture was stirred at 135° C. for 1 hour to dissolve the phthalic anhydride. The resulting homogeneous solution was cooled to room temperature. 30 ml of the homogeneous solution was added dropwise to 80 ml of titanium tetrachloride (−20° C.) over 45 minutes. The mixture was then heated to 110° C. over 4 hours, followed by the addition of 14 ml of diisobutyl phthalate. The mixture was then stirred at 110° C. for 2 hours. The mixture was then filtered. The solid was washed with decane to obtain a solid component. The titanium content in the solid component was 3.0 wt %.

Production of Solid Catalyst Component (A)

A solid catalyst component (A) and a polymerization catalyst were produced, and polymerization was carried out in the same manner as in Example 1, except for using the resulting solid component. The results are shown in Table 1. The titanium content in the solid catalyst component (A) was 3.4 wt %. Specifically, the titanium content in the solid catalyst component (A) increased by 0.4 wt % (3.4-3.0 wt %) by performing the component (d) post-contact step. Whether or not the above washing method is appropriate for quantitative determination of the titanium compound was determined in the same manner as in Example 1. The amount of titanium compound washed away was 0.4 wt %. The amount of titanium tetrachloride contained in the heptane solution was 1.5 times (molar ratio of titanium atoms) the amount of the titanium compound contained in the solid component.

Example 4

A polymerization catalyst was produced, and polymerization was carried out in the same manner as in Example 1, except for using a heptane solution containing 20 ml of titanium tetrachloride instead of the heptane solution containing 2 ml of titanium tetrachloride when producing the solid catalyst component (A). The results are shown in Table 1. The titanium content in the solid component was 3.3 wt %. The titanium content in the solid catalyst component (A) was 5.5 wt % (i.e., the titanium content increased by 2.2 wt %). The amount of titanium tetrachloride contained in the heptane solution was 13.2 times (molar ratio of titanium atoms) the amount of the titanium compound contained in the solid component.

Example 5

A polymerization catalyst was produced, and polymerization was carried out in the same manner as in Example 1, except for using a heptane solution containing 0.2 ml of titanium tetrachloride instead of the heptane solution containing 2 ml of titanium tetrachloride when producing the solid catalyst component (A). The results are shown in Table 1. The titanium content in the solid component was 3.3 wt %. The titanium content in the solid catalyst component (A) was 3.7 wt % (i.e., the titanium content increased by 0.4 wt %). The amount of titanium tetrachloride contained in the heptane solution was 0.1 times (molar ratio of titanium atoms) the amount of the titanium compound contained in the solid component.

Comparative Example 1

Production of Solid Catalyst Component

A 500 ml round bottom flask equipped with a stirrer, of which the internal atmosphere had been sufficiently replaced with nitrogen gas, was charged with 20 g of diethoxymagnesium and 100 ml of toluene to prepare a suspension. The suspension was added to a 500 ml round bottom flask equipped with a stirrer, of which the internal atmosphere had been sufficiently replaced with nitrogen gas, that was charged with a solution of 40 ml of toluene and 60 ml of titanium tetrachloride to obtain a suspension. The suspension was reacted at 6° C. for 1 hour. After the addition of 6 ml of di-n-butyl phthalate, the mixture was heated to 105° C., and reacted for 2 hours with stirring. After completion of the reaction, the product was washed four times with 200 ml of toluene (100° C.). After the addition of 80 ml of toluene and 20 ml of titanium tetrachloride, the mixture was stirred (reacted) at 100° C. for 0.5 hours. The product was washed four times with 150 ml of heptane (40° C.), filtered, and dried to obtain a powdery solid catalyst component. The titanium content in the solid catalyst component was 2.9 wt %.

Quantitative Determination of Titanium Tetrachloride

The content of titanium tetrachloride was determined in the same manner as in Example 1, except for using the solid catalyst component obtained as described above instead of the solid catalyst component (A). The titanium content in the solid catalyst composition after performing the washing operation eight times was 2.9 wt %. Specifically, an increase in titanium content was 0 wt %.

Production of Polymerization Catalyst and Polymerization

Experiments were performed in the same manner as in Example 1, except for using the solid catalyst component obtained as described above. The results are shown in Table 2.

Comparative Example 2

A polymerization catalyst was produced, and polymerization was carried out in the same manner as in Example 1, except for using a heptane solution containing 0.1 ml of titanium tetrachloride instead of the heptane solution containing 2 ml of titanium tetrachloride when producing the solid catalyst component (A). The results are shown in Table 2. The titanium content in the solid component was 3.3 wt %. The titanium content in the solid catalyst component (A) was 3.4 wt % (i.e., the titanium content increased by 0.1 wt %). The amount of titanium tetrachloride contained in the heptane solution was 0.05 times (molar ratio of titanium atoms) the amount of the titanium compound contained in the solid component.

Comparative Example 3

A polymerization catalyst was produced, and polymerization was carried out in the same manner as in Example 1, except for using a heptane solution containing 26 ml of titanium tetrachloride instead of the heptane solution containing 2 ml of titanium tetrachloride when producing the solid catalyst component (A). The results are shown in Table 2. The titanium content in the solid component was 3.3 wt %. The titanium content in the solid catalyst component (A) was 6.0 wt % (i.e., the titanium content increased by 2.7 wt %). The amount of titanium tetrachloride contained in the heptane solution was 17 times (molar ratio of titanium atoms) the amount of the titanium compound contained in the solid component.

TABLE 1

|  | Example 1 | Example 2 | Example 3 | Example 4 | Example 5 |
|---|---|---|---|---|---|
| Polymerization activity (g-PP/g-cat) | 53,700 | 49,500 | 50,400 | 47,800 | 45,500 |
| HI (wt %) | 98.2 | 98.6 | 98.3 | 98.3 | 98.1 |
| MFR (g/10 min) | 7.7 | 9.4 | 8.2 | 8.5 | 9.5 |
| Fine powder (45 μm or less) (wt %) | 0.1 | 0* | 0.2 | 0.3 | 0.3 |
| Fine powder (75 μm or less) (wt %) | 0.3 | 0.2 | 0.3 | 0.3 | 0.4 |
| Coarse powder (1700 μm or more) (wt %) | 4.3 | 3.1 | 3.2 | 4.1 | 4.5 |
| Average particle size of solid polymer (μm) | 1260 | 1220 | 1230 | 1270 | 1310 |
| Particle size distribution [(D90-D10)/D50] | 0.5 | 0.5 | 0.6 | 0.8 | 0.8 |

0*: Equal to or less than the measurement lower limit

TABLE 2

|  | Comparative Example 1 | Comparative Example 2 | Comparative Example 3 |
|---|---|---|---|
| Polymerization activity (g-PP/g-cat) | 46,200 | 38,400 | 45,100 |
| HI (wt %) | 98.5 | 97.6 | 98.1 |
| MFR (g/10 min) | 6.8 | 14 | 7.5 |
| Fine powder (45 μm or less) (wt %) | 0.7 | 0.9 | 0.8 |
| Fine powder (75 μm or less) (wt %) | 1.5 | 1.2 | 1.9 |
| Coarse powder (1700 μm or more) (wt %) | 7.2 | 3.2 | 8.2 |
| Average particle size of solid polymer (μm) | 1250 | 1100 | 1320 |
| Particle size distribution [(D90-D10)/D50] | 1.5 | 1.2 | 1.7 |

Example 6

A solid component, a solid catalyst component (A), and a polymerization catalyst were produced, and polymerization was carried out in the same manner as in Example 1, except for using an equal amount of diethyl diisobutyl malonate instead of n-butyl phthalate. The results are shown in Table 3. The titanium content in the solid component and the solid catalyst component (A) was 4.2 wt % and 5.0 wt %, respectively (i.e., the titanium content increased by 0.8 wt %). The amount of titanium tetrachloride contained in the heptane solution was 1.3 times (molar ratio of titanium atoms) the amount of the titanium compound contained in the solid component.

Example 7

A solid component, a solid catalyst component (A), and a polymerization catalyst were produced, and polymerization was carried out in the same manner as in Example 1, except for using an equal amount of 2-isopropyl-2-isopentyl-1,3-dimethoxypropane instead of di-n-butyl phthalate. The results are shown in Table 3. The titanium content in the solid component and the solid catalyst component (A) was 3.9 wt % and 4.6 wt %, respectively (i.e., the titanium content increased by 0.7 wt %). The amount of titanium tetrachloride contained in the heptane solution was 1.3 times (molar ratio of titanium atoms) the amount of the titanium compound contained in the solid component.

Example 8

A solid component, a solid catalyst component (A), and a polymerization catalyst were produced, and polymerization was carried out in the same manner as in Example 1, except for using an equal amount of diethyl 2,3-diisopropylsuccinate instead of di-n-butyl phthalate. The results are shown in Table 3. The titanium content in the solid component and the solid catalyst component (A) was 3.7 wt % and 4.3 wt %, respectively (i.e., the titanium content increased by 0.6 wt %). The amount of titanium tetrachloride contained in the heptane solution was 1.3 times (molar ratio of titanium atoms) the amount of the titanium compound contained in the solid component.

Example 9

A solid catalyst component (A) and a polymerization catalyst were produced, and polymerization was carried out in the same manner as in Example 1, except that the mixture of the solid component (A1) and the heptane solution was stirred at 50° C. The results are shown in Table 3. The titanium content in the solid component (A1) was 3.3 wt %, and the titanium content in the solid catalyst component (A) was 3.7 wt % (i.e., the titanium content increased by 0.4 wt %). The amount of titanium tetrachloride contained in the heptane solution was 1.3 times (molar ratio of titanium atoms) the amount of the titanium compound contained in the solid component.

Comparative Example 4

A solid catalyst component (A) and a polymerization catalyst were produced, and polymerization was carried out in the same manner as in Example 1, except that the mixture of the solid component (A 1) and the heptane solution was stirred at room temperature (23° C.). The results are shown in Table 3. The titanium content in the solid component (A1) was 3.3 wt %, and the titanium content in the solid catalyst component (A) was 3.4 wt % (i.e., the titanium content increased by 0.1 wt %). The amount of titanium tetrachloride contained in the heptane solution was 1.3 times (molar ratio of titanium atoms) the amount of the titanium compound contained in the solid component.

TABLE 3

| | Example 6 | Example 7 | Example 8 | Example 9 | Comparative Example 4 |
|---|---|---|---|---|---|
| Polymerization activity (g-PP/g-cat) | 50,300 | 47,500 | 45,800 | 40,700 | 20,000 |
| HI (wt %) | 97.4 | 98.8 | 98.1 | 98.3 | 98.0 |
| MFR (g/10 min) | 29 | 14 | 6.7 | 8.6 | 15 |
| Fine powder (45 μm or less) (wt %) | 0* | 0.1 | 0* | 0.1 | 0.1 |
| Fine powder (75 μm or less) (wt %) | 0.1 | 0.3 | 0.2 | 0.3 | 0.4 |
| Coarse powder (1700 μm or more) (wt %) | 1.5 | 4.1 | 4.2 | 4.5 | 0 |
| Average particle size of solid polymer (μm) | 1130 | 1270 | 1250 | 1270 | 930 |
| Particle size distribution [(D90-D10)/D50] | 0.3 | 0.4 | 0.4 | 0.8 | 0.6 |

0*: Equal to or less than the measurement lower limit

As is clear from the results shown in Tables 1 to 3, a polymer that has high stereoregularity and a narrow particle size distribution can be obtained in high yield while suppressing production of a fine powder by polymerizing propylene using the solid catalyst component produced by the method according to one embodiment of the invention.

INDUSTRIAL APPLICABILITY

When polymerizing an olefin in the presence of the olefin polymerization catalyst according to one embodiment of the invention, a polymer having high stereoregularity and a narrow particle size distribution can be obtained in high yield while suppressing production of a fine powder as compared with the case of using a related-art catalyst.

The invention claimed is:

1. A method of producing a solid catalyst component for olefin polymerization, the method comprising causing a solid component (A1) obtained by causing a magnesium compound (a), a titanium halide compound (b), and an electron donor compound (c) to come in contact with each other, to come in contact with an inert organic solvent that includes a titanium compound (d) in an amount 0.1 to 15 times (molar ratio of titanium atoms) the amount of the titanium compound included in the solid component (A1) so that the titanium compound (d) remains on the surface or the inside of the solid component (A1), and drying the mixture in a state in which the titanium compound (d) remains on the surface or the inside of the solid component (A1) to obtain a powdery solid catalyst component for olefin polymerization in which the titanium compound (d) remains.

2. The method according to claim 1, wherein the titanium compound (d) is titanium tetrachloride.

3. The method according to claim 1, wherein the magnesium compound (a) is at least one selected from the group consisting of a magnesium dihalide, a dialkylmagnesium, an alkylmagnesium halide, a dialkoxymagnesium, a diaryloxymagnesium, an alkoxymagnesium halide, and a fatty acid magnesium.

4. The method according to claim 1, wherein the titanium halide compound (b) is at least one compound represented by the formula:

$$Ti(OR^2)_n X_{4-n}$$

wherein $R^2$ represents an alkyl group having 1 to 4 carbon atoms, X represents a halogen atom, and n is an integer from 0 to 4.

5. The method according to claim 1, wherein the electron donor compound (c) is at least one selected from the group consisting of an alcohol, a phenol, an ether, an ester, a ketone, an acid halide, an aldehyde, an amine, an amide, a nitrile, an isocyanate, an organosilicon compound including an Si—O—C bond, and an organosilicon compound including an Si—N—C bond.

6. The method according to claim 1, wherein the inert organic solvent is at least one selected from the group consisting of a saturated hydrocarbon compound, an aromatic hydrocarbon compound, a halogenated hydrocarbon compound, and an ether, provided that the inert organic solvent dissolves the titanium halide compound (b), but does not dissolve a dialkoxymagnesium.

* * * * *